(12) United States Patent
Nakajima et al.

(10) Patent No.: US 8,044,771 B2
(45) Date of Patent: *Oct. 25, 2011

(54) KEYLESS ENTRY SYSTEM

(75) Inventors: Satoshi Nakajima, Miyagi-ken (JP); Satoshi Hayasaka, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 786 days.

This patent is subject to a terminal disclaimer.

(21) Appl. No.: 12/104,733

(22) Filed: Apr. 17, 2008

(65) Prior Publication Data

US 2008/0258868 A1    Oct. 23, 2008

(30) Foreign Application Priority Data

Apr. 19, 2007    (JP) .................................. 2007-110042

(51) Int. Cl.
    *G08B 21/00*    (2006.01)
(52) U.S. Cl. ............. 340/5.72; 340/426.13; 340/426.15; 340/426.16; 340/426.36
(58) Field of Classification Search .................. 340/5.72, 340/426.13, 426.15, 426.16, 426.36
    See application file for complete search history.

(56) References Cited

U.S. PATENT DOCUMENTS

| 7,224,980 | B2 | 5/2007 | Hara | |
|---|---|---|---|---|
| 2002/0024460 | A1* | 2/2002 | Ghosh et al. | 342/43 |
| 2004/0183714 | A1* | 9/2004 | Yamashita et al. | 342/70 |

FOREIGN PATENT DOCUMENTS

| DE | 102 02 330 A1 | 7/2003 |
|---|---|---|
| WO | 2004/104943 A1 | 12/2004 |

OTHER PUBLICATIONS

European Search Report issued in corresponding European Patent Application No. 08 00 6399; issued Jul. 6, 2009.

* cited by examiner

*Primary Examiner* — Jennifer Mehmood
*Assistant Examiner* — Mark Rushing
(74) *Attorney, Agent, or Firm* — Brinks Hofer Gilson & Lione

(57) ABSTRACT

A keyless entry system includes a vehicle-side device and a portable device. The vehicle-side device includes a vehicle-side transmission unit connected to a plural transmission antenna and transmitting a request signal, and a vehicle-side reception unit receiving and transmitting an answer signal. The portable device includes a portable device-side control unit that detects the intensity of the signals transmitted from the plural transmission antennas. The vehicle-side control unit or the portable device-side control unit calculates distances between the portable device and the respective transmission antennas based on data of the intensity of the signals transmitted from the plural transmission antennas detected by the portable device-side control unit. When an added value of the distances calculated based on two of the intensity data is smaller than a predetermined threshold value, it is determined that the portable device is located inside the vehicle.

2 Claims, 6 Drawing Sheets

KEYLESS ENTRY SYSTEM

RELATED APPLICATIONS

This application claims the benefit of priority under 35 U.S.C. §119 to Japanese Patent Application No. 2007-110042 filed Apr. 19, 2007, the contents of which are hereby incorporated by reference in their entirety.

BACKGROUND OF THE DISCLOSURE

1. Field of the Disclosure

The present disclosure relates to a keyless entry system that includes a vehicle-side device and a portable device performing a wireless communication with each other, thereby locking or unlocking a door. In particular, the present disclosure relates to a keyless entry system that can determine with high precision whether a portable device is located inside or outside a vehicle.

2. Description of the Related Art

In the past, a keyless entry system is known including a vehicle-side device installed in a vehicle and a portable device carried by a user which perform a wireless communication with each other, thereby locking or unlocking a door of the vehicle. In recent years, a passive keyless entry system is known in which as a portable device approaches a vehicle, a communication is automatically established between a vehicle-side device and the portable device to perform authentication of ID set unique to the individual portable devices, thereby locking or unlocking a door of the vehicle. For example, such a keyless entry system is disclosed in U.S. Pat. No. 7,224,980 (corresponding to JP-A-2002-77972).

In the case of the passive keyless entry system, it is important to determine whether the portable device is located inside or outside the vehicle. For this reason, plural transmission antennas are installed at respective locations in the vehicle. Then, the portable device detects the intensity of the signals received from the respective transmission antennas and calculates the position of the portable device based on the detected intensity, thereby determining whether the portable device is inside or outside the vehicle.

The transmission antennas installed in the vehicle are provided at least at locations such as a door mirror on the outer body of the vehicle. The transmission antennas installed at locations on the outer body of the vehicle are connected to a circuit unit having a control unit via signal lines wired within the vehicle. Here, electromagnetic waves leak from the signal lines along which signals are transmitted. Therefore, when the portable device is located in the vicinity of the signal line connecting the circuit unit and the transmission antennas, the signal intensity detected by the portable device may become greater than its actual intensity since the intensity of signals leaking from the signal lines is added to the intensity of the signals transmitted from the transmission antennas. In such a case, when the distance to the transmission antenna is calculated based on the signal intensity detected by the portable device, the calculated distance may be smaller than the actual distance. Therefore, it becomes practically impossible to calculate the position of the portable device based on the distances to the plural transmission antennas and to determine the position of the portable device.

Specifically, when signals are transmitted from three transmission antennas, a combination of intensity data of the signals transmitted from the three transmission antennas corresponds to a particular point at which the portable device is located. However, when the reception intensity is increased greater than the actual intensity, there is a case where the distance to the portable device corresponding to the intensity of the signal transmitted from one transmission antenna does not overlap the position of the portable device determined by the intensities of the signals transmitted from the remaining two transmission antennas. In such a case, the combination of the intensity data does not correspond to a particular point. The same statement can be applied to the case where signals are transmission from two transmission antennas. The amount of leakage from the signal line differs from vehicle to vehicle and mainly depends on the way the signal lines are attached. Therefore, it is difficult to normalize the leakage amount.

SUMMARY OF THE DISCLOSURE

The present disclosure provides a keyless entry system that includes a vehicle-side device and a portable device. The vehicle-side device includes a vehicle-side transmission unit and a vehicle-side reception unit. The vehicle-side transmission unit is installed in a vehicle and connected to plural transmission antennas. The vehicle-side transmission unit transmits a request signal via signal lines. The vehicle-side reception unit receives an answer signal. The portable device includes a portable device-side reception unit receiving the request signal, and a portable device-side transmission unit transmitting the answer signal. The vehicle-side device includes a vehicle-side control unit that performs a predetermined control when the answer signal from the portable device is authenticated. The portable device includes a portable device-side control unit that detects the intensity of the signals transmitted from the plural transmission antennas. The vehicle-side control unit or the portable device-side control unit calculates distances between the portable device and the respective transmission antennas based on data of the intensity of the signals transmitted from the plural transmission antennas detected by the portable device-side control unit. When an added value of the distances calculated based on two of the intensity data is smaller than a predetermined threshold value, it is determined that the portable device is located inside the vehicle.

In an embodiment of the keyless entry system of the present disclosure, the predetermined threshold value may be set smaller than the distance between two transmission antennas corresponding to the two intensity data.

BRIEF DESCRIPTION OF THE DRAWINGS

The components in the figures are not necessarily to scale, emphasis instead being placed upon illustrating the principles of the invention. Moreover, in the figures, like reference numerals designate corresponding parts throughout the different views.

DESCRIPTION OF THE EMBODIMENTS

Figure 1:
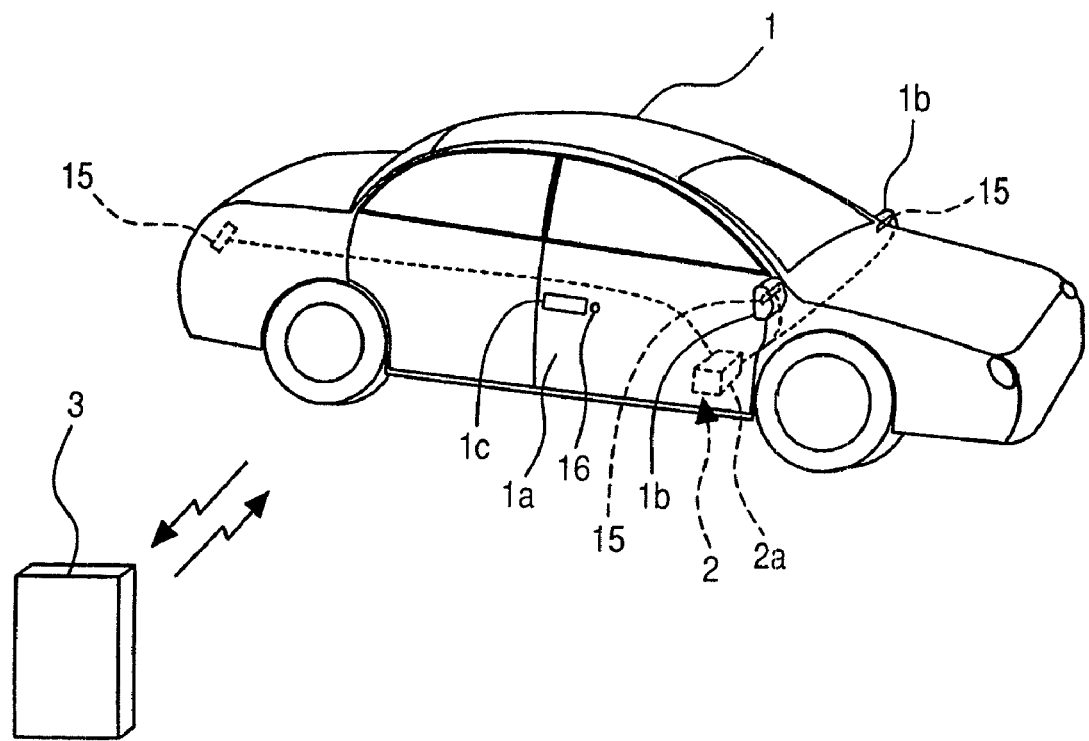
FIG. 1 is a schematic view of a keyless entry system according to an embodiment.

Exemplary embodiments may be better understood with reference to the drawings, but these examples are not intended to be of a limiting nature. Like numbered elements in the same or different drawings perform equivalent functions. FIG. 1 is a schematic view of a keyless entry system according to an embodiment. A keyless entry system of the present embodiment locks or unlocks a door 1a of a vehicle 1. A vehicle-side device 2 is provided to the vehicle 1. A user carries and uses a portable device 3 to establish a wireless communication between the vehicle-side device 2 and the portable device 3, thereby performing authentication or issuing instructions such as a lock instruction or an unlock instruction. The vehicle-side device 2 includes a circuit unit 2a within the vehicle 1 and plural transmission antennas 15 at respective locations in the vehicle 1. Request signals are transmitted from the transmission antennas 15 to the portable device 3.

According to the present embodiment, a user carrying the portable device 3 needs to press a request switch 16 provided in the vicinity of a door knob 1c of the door 1a in order to unlock the door 1a. When the request switch 16 is pressed, a communication is established between the vehicle-side device 2 and the portable device 3, authenticating the portable device 3. If it is determined that the portable device 3 is outside the vehicle, a vehicle-side control unit 12 performs a control of unlocking the door 1a.

Figure 2:
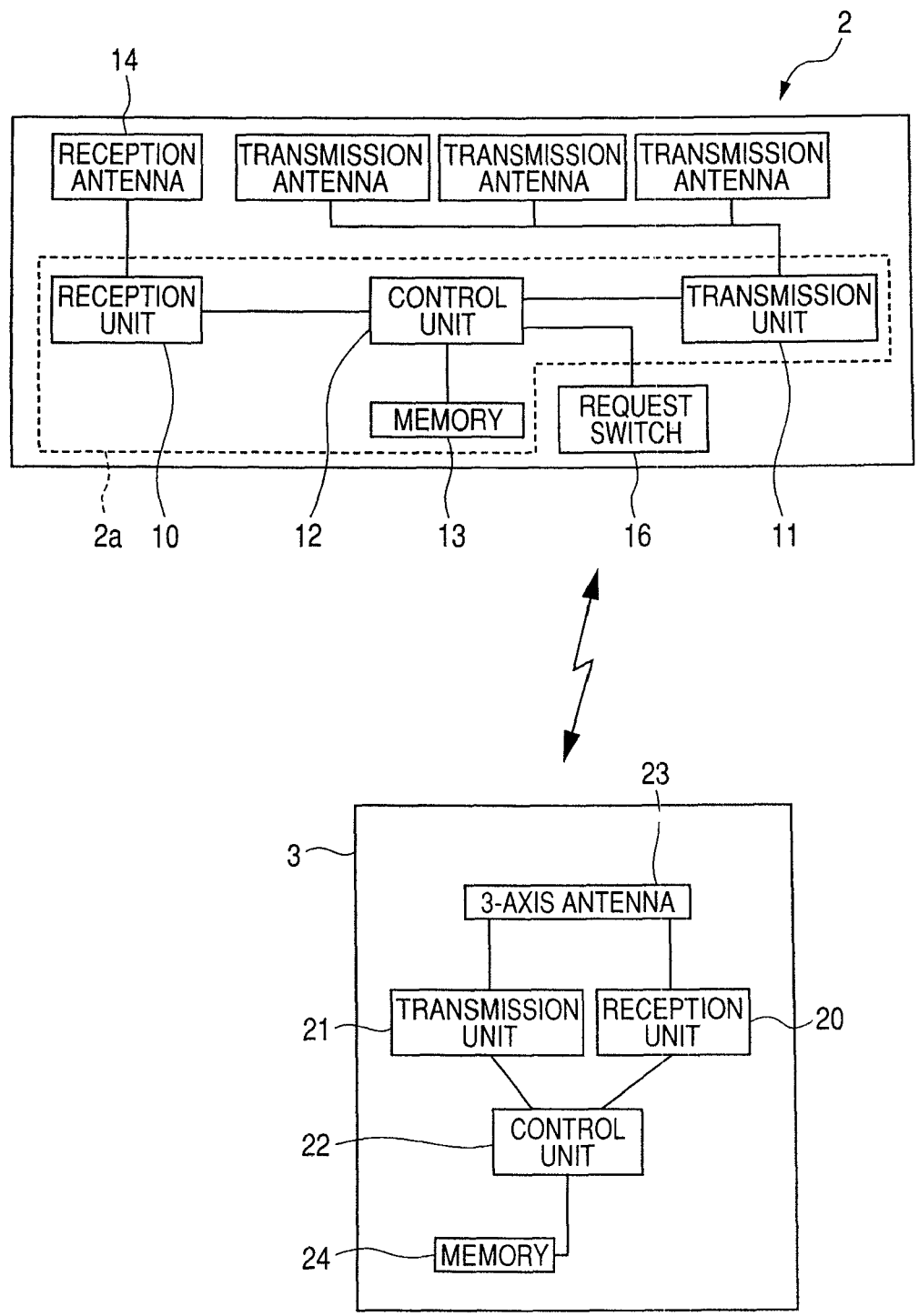
FIG. 2 is a block diagram of the keyless entry system.

Next, the construction of the vehicle-side device 2 and the portable device 3 will be described. FIG. 2 is a block diagram of the keyless entry system. As shown in FIG. 2, the vehicle-side device 2 includes a vehicle-side reception unit 10 that receives an answer signal from the portable device 3, a vehicle-side transmission unit 11 that transmits a request signal to the portable device 3, and a vehicle-side control unit 12 that performs various controls when receiving the answer signal or when the request switch 16 is pressed.

The vehicle-side control unit 12 is connected to a memory 13 that stores information required for control such as a V-ID (Vehicle-ID), which is a unique identification symbol of a vehicle, or IDs of plural portable devices capable of operating one vehicle as well as the request switch 16 described above. The vehicle-side reception unit 10 is connected to a reception antenna 14 for receiving the answer signal. The vehicle-side transmission unit 11 is connected to plural transmission antennas 15 and 15 for transmitting the request signal. The circuit unit 2a shown in FIG. 1 includes the vehicle-side reception unit 10, the vehicle-side transmission unit 11, the vehicle-side control unit 12, and the memory 13.

The portable device 3 includes a portable device-side reception unit 20 that receives the request signal from the vehicle-side device 2, a portable device-side transmission unit 21 that transmits the answer signal to the vehicle-side device 2, a portable device-side control unit 22 that performs various controls when receiving the request signal, and a memory 24 that stores its own ID, the V-ID, and the like. The portable device-side reception unit 20 and the portable device-side transmission unit 21 are connected to a three-axis antenna 23 that performs transmission and reception of the request signal or the answer signal and has directivity characteristics, wherein beams transmitted from the three axes travel along straight lines perpendicular to each other.

By a wakeup signal contained in the request signal transmitted from the vehicle-side device 2 and received by the portable device reception unit 20, the portable device-side control unit 22 changes its state to a normal state from a sleep state wherein its power consumption is substantially zero. The portable device-side control unit 22 performs various operations in accordance with a command contained in the request signal. The portable device-side control unit 22 can detect an intensity of the signal received by the three-axis antenna 23.

Figure 3:
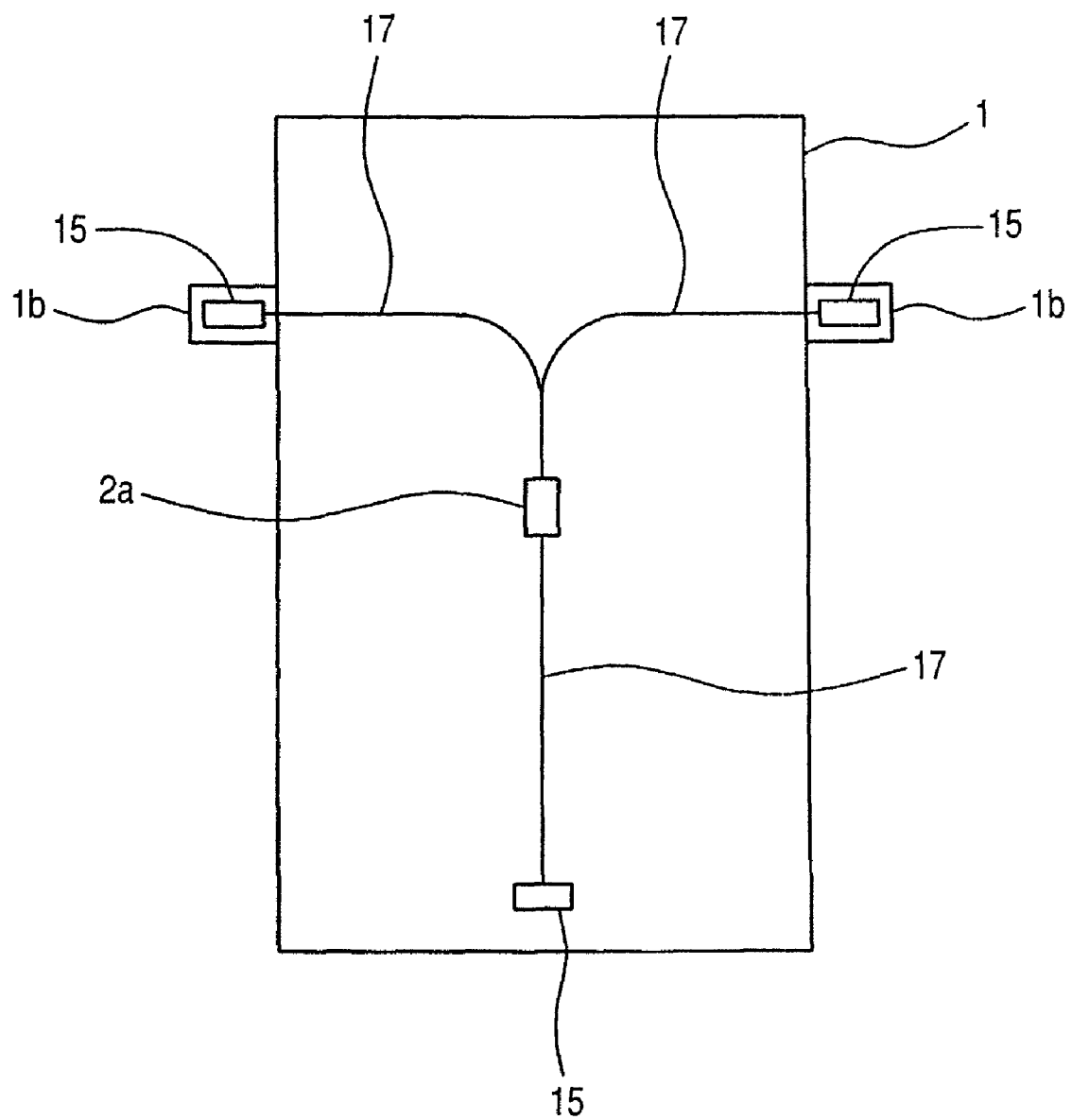
FIG. 3 is a schematic top view of a vehicle.

Next, the arrangement and connection of the reception antennas 15 of the vehicle 1 will be described. FIG. 3 is a schematic top view of the vehicle 1. As shown in FIG. 3, the transmission antennas 15 are arranged such that two antennas are provided at the left and right door mirrors 1b of the vehicle 1 and one antenna is provided at a rear portion of the vehicle 1. The respective transmission antennas 15 are connected to the circuit unit 2a by signal lines 17 wired within the vehicle. Electromagnetic waves transmitted from the respective transmission antennas 15 are transmitted inside and outside the vehicle 1. Therefore, the portable device 3 can receive the electromagnetic waves regardless of its location whether inside or outside the vehicle.

Figure 4:
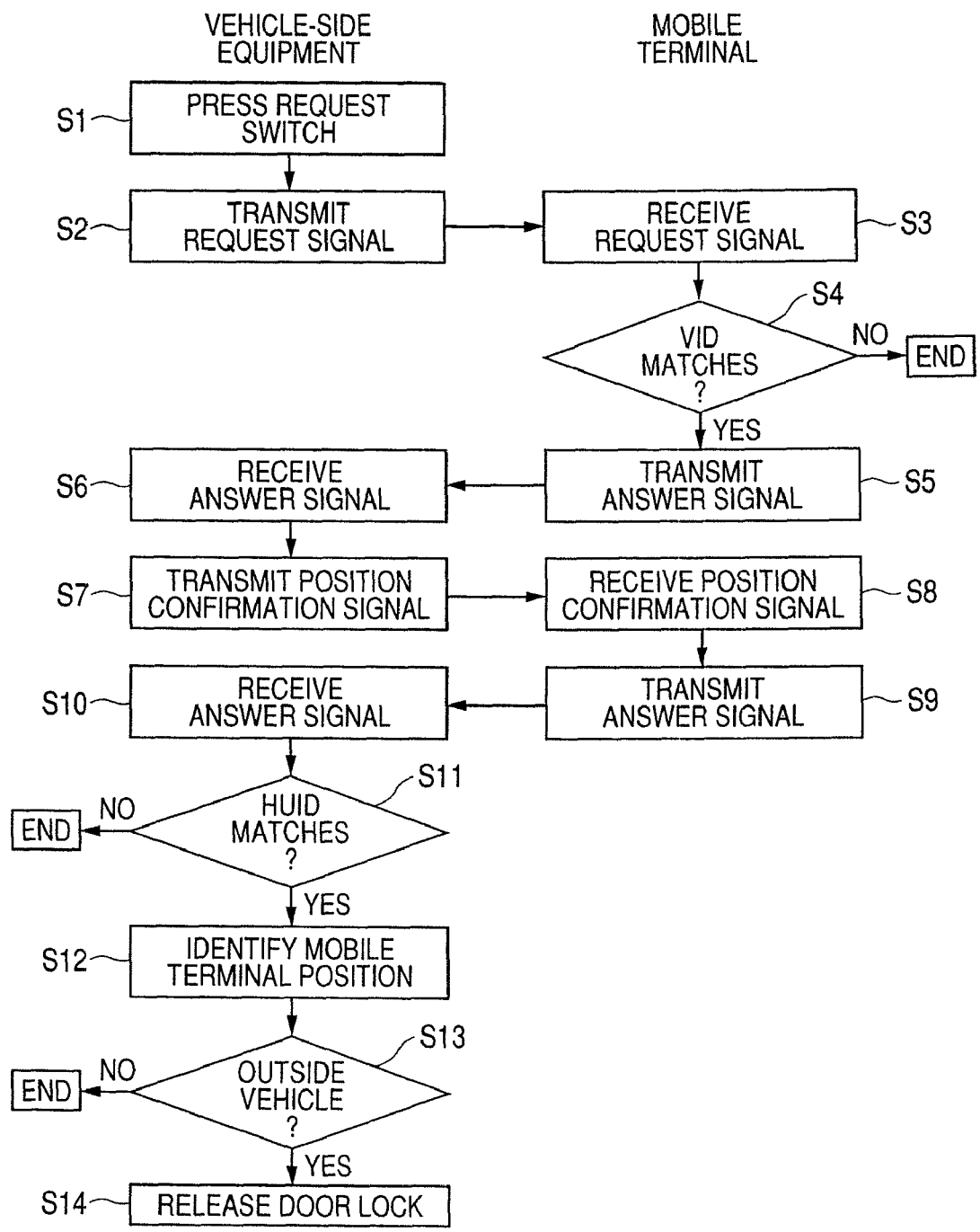
FIG. 4 is a flow chart of an unlock operation.
Figure 5:
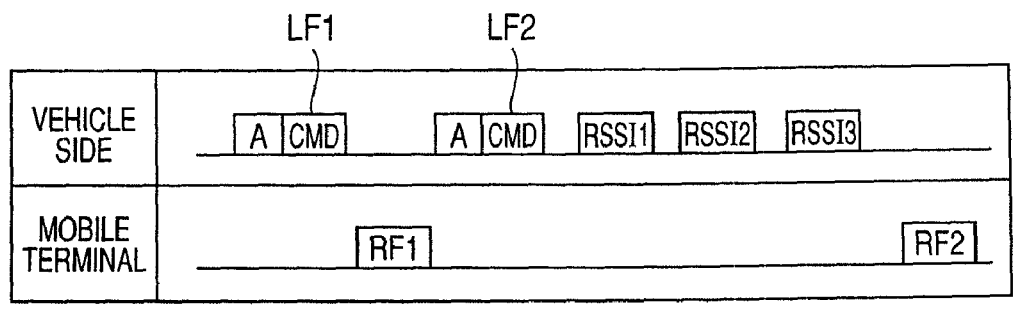
FIG. 5 is a timing chart of signals transmitted from a vehicle-side device and a portable device, respectively.

Next, the operations of the keyless entry system will be described. FIG. 4 is a flow chart of an unlock operation, and FIG. 5 is a timing chart of signals transmitted from the vehicle-side device 2 and the portable device 3, corresponding to the flow chart of FIG. 4. According to the keyless entry system of the present embodiment, when the request switch 16 provided to the vehicle 1 is pressed, the vehicle-side device 2 performs a wireless communication with the portable device 3, thereby enabling unlocking of the door. Therefore, when a user presses the request switch 16 of the vehicle 1, the flow of the unlock operation is started (S1).

Once the request switch 16 is pressed, the vehicle-side control unit 12 causes the vehicle-side transmission unit 11 to transmit a request signal LF1 (S2). As shown in FIG. 5, the request signal LF1 is composed of a signal A such as a wakeup signal, a command signal CMD, and the like. The command signal CMD contains information such as a V-ID (Vehicle-ID), which is a unique identification symbol of a vehicle.

In the portable device 3, when the request signal LF1 is received by the portable device-side reception unit 20, the portable device-side control unit 22 changes its state from a sleep state to a normal state in response to a wakeup signal and determines whether the V-ID contained in the request signal LF1 matches a V-ID held by the portable device 3. If the V-IDs do not match each other, the flow stops here. When the V-IDs match each other, the portable device-side control unit 22 causes the portable device-side transmission unit 21 to transmit an answer signal RF1 (S5).

When the answer signal RF1 is received by the vehicle-side reception unit 10 (S6), the vehicle-side control unit 12 causes the vehicle-side transmission unit 11 to transmit a position confirmation signal LF2. As shown in FIG. 5, the position confirmation signal LF2 contains a wakeup signal similar to the case of the request signal LF1 and is composed of a signal A containing IDs of portable devices, a signal containing a command signal CMD, plural Rssi measurement signals sequentially transmitted from the respective transmission antennas 15, and the like.

As shown in FIG. 5, the Rssi measurement signals transmitted from the respective transmission antennas 15 are pulsating signals with a predetermined intensity and lasting a predetermined period and used to measure reception intensity at the portable device 3. The respective Rssi measurement signals are transmitted by the vehicle-side transmission unit 11 from the respective transmission antennas 15 on a predetermined order and at a predetermined interval of time after a predetermined period after the RF1 signal from the portable device is received. The portable device 3 has stored therein information on the respective antennas that will transmit signals when the RF1 signal has been received at the vehicle and information on the time at which the signals will be transmitted from the respective antennas. The portable device 3 starts a timer when the RF1 signal is received by at the vehicle, thereby measuring the respective reception time. By comparing the measured reception time with the stored information, the portable device 3 can identify which transmission antenna 15 the Rssi measurement signal has been transmitted from.

The position confirmation signal LF2 containing the Rssi measurement signals transmitted from the respective transmission antennas 15 are received by the portable device-side reception unit 20 of the portable device 3 (S8). Then, the portable device-side control unit 22 measures the intensity of the respective Rssi measurement signals using the three-axis antenna 23 and transmits information on intensity data for each transmission antenna measured by the three-axis antenna 23, as an answer signal RF2, to the vehicle-side device 2 (S9). At this time, the answer signal RF2 is transmitted along with an HU-ID contained in the RF2 signal, which is an ID set unique to the individual portable device. The measurement method of the signal intensity is not limited to a method that transmits an Rssi measurement signal from the vehicle 1 and measures the intensity of the Rssi measurement signal at the portable device 3. Alternatively, the intensity of the request signal transmitted from the vehicle 1 may be measured.

The vehicle-side transmission unit 11 of the vehicle-side device 2 receives the answer signal RF2 from the portable device 3 (S10). When receiving the answer signal RF2, the vehicle-side control unit 12 determines whether the HU-ID contained in the answer signal RF2 matches that registered in the vehicle (S11). If the HU-IDs do not match each other, the flow stops here. When the HU-IDs match each other, the position of the portable device 3 is determined (S12).

Upon transmission and reception of the request signal LF1, the answer signal RF1 is transmitted at different times for each portable device 3 after transmission of the corresponding request signal LF1 and the period of time between the transmissions is measured. Accordingly, it is possible to immediately and simply identify the portable device 3 based on which of the plural portable devices 3 the response was transmitted from. Upon transmission and reception of the request signal LF2, the first substantial and exact authentication and position confirmation is performed with respect to the portable device 3 detected during transmission of the request signal LF1 by using the individual IDs of the portable devices having greater information amount. When the authentication failed, similar operation is performed to the respective portable devices 3. The authentication of the respective portable devices 3 may be performed only in this step during transmission of the request signal LF2 without identifying the portable device 3 during transmission of the request signal LF1. Alternatively, the authentication of the respective portable devices 3 may be performed after transmission of the Rssi measurement signal.

The determination of position of the portable device 3 by the vehicle-side control unit 12 is performed in the following manner. First, the vehicle-side control unit 12 extracts identification information and intensity data contained in the answer signal RF2 transmitted from the portable device 3 and calculates the distance between the portable device 3 and the transmission antennas 15 based on the intensity data. Since three transmission antennas 15 are installed in the vehicle 1, three values are calculated as the distance between the portable device 3 and the transmission antennas 15.

Figure 6:
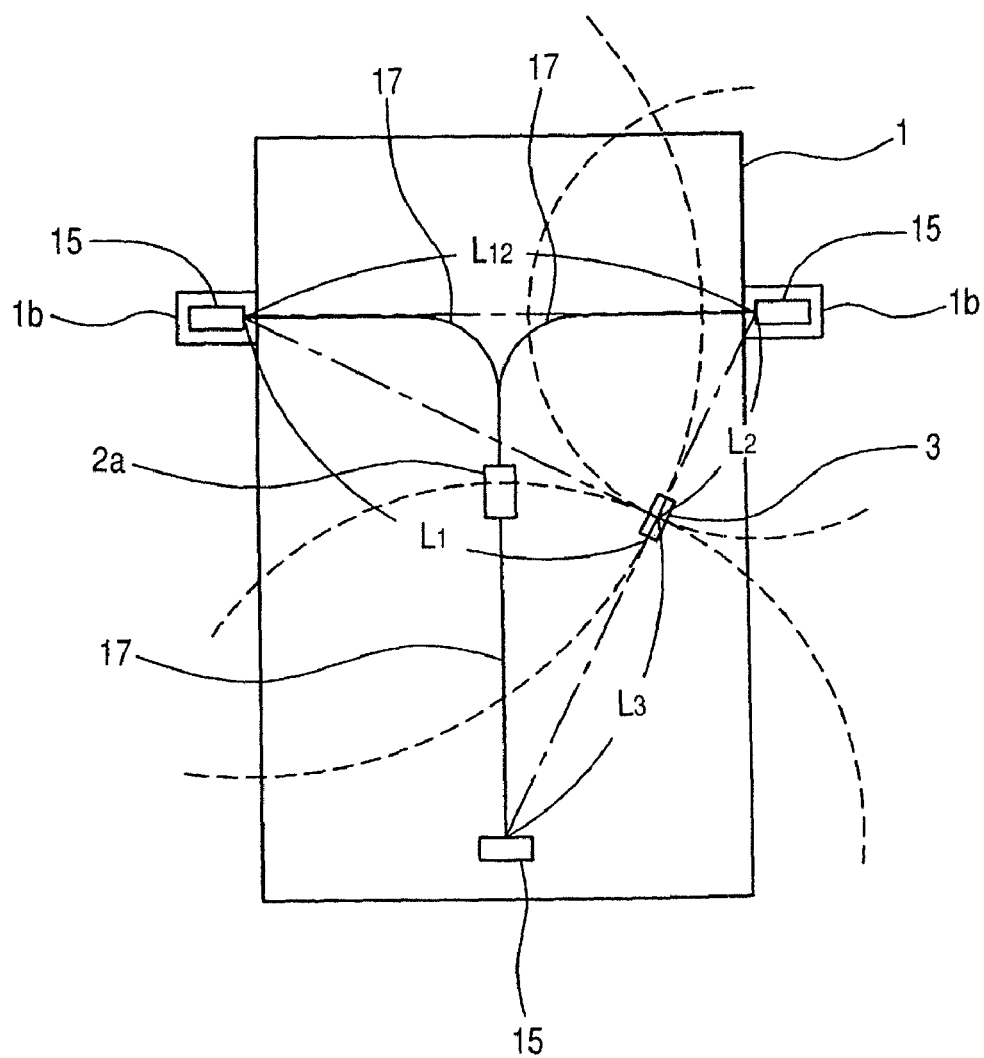
FIG. 6 is a schematic top view of a vehicle, showing the relationship of distance between respective transmission antennas.

FIG. 6 is a schematic top view of the vehicle 1, showing the relationship of distance between the respective transmission antennas 15. In the drawing, the portable device 3 is located within the vehicle. From the intensity data detected by the portable device 3, a distance $L_1$ between the portable device 3 and the transmission antenna 15 installed at the left door mirror 1b, a distance $L_2$ between the portable device 3 and the transmission antenna 15 installed at the right door mirror 1b, and a distance $L_3$ between the portable device 3 and the transmission antenna 15 installed at the rear portion are calculated.

In this case, the position of the portable device 3 is determined as being located at an intersection of three spheres; a sphere of a radius $L_1$ centered at the transmission antenna 15 installed at the left door mirror 1b, a sphere of a radius $L_2$ centered at the transmission antenna 15 installed at the right door mirror 1b, and a sphere of a radius $L_3$ centered at the transmission antenna 15 installed at the rear portion. Therefore, in this case, the portable device 3 is determined as being located inside the vehicle. To the contrary, if the intersection of the three spheres is located outside the vehicle, the portable device 3 is determined as being located outside the vehicle.

As in the case of FIG. 6, when the portable device 3 is located remote from the signal line 17 connecting the transmission antennas 15 and the circuit unit 2a, it is possible to calculate the exact distance between the portable device 3 and the transmission antennas 15 based on the intensity of the signal received by the portable device 3. However, if the portable device 3 is located in the vicinity of the signal line 17, the electromagnetic wave leaking from the signal line 17 may have influence on the intensity of the signal received by the portable device 3.

Figure 7:
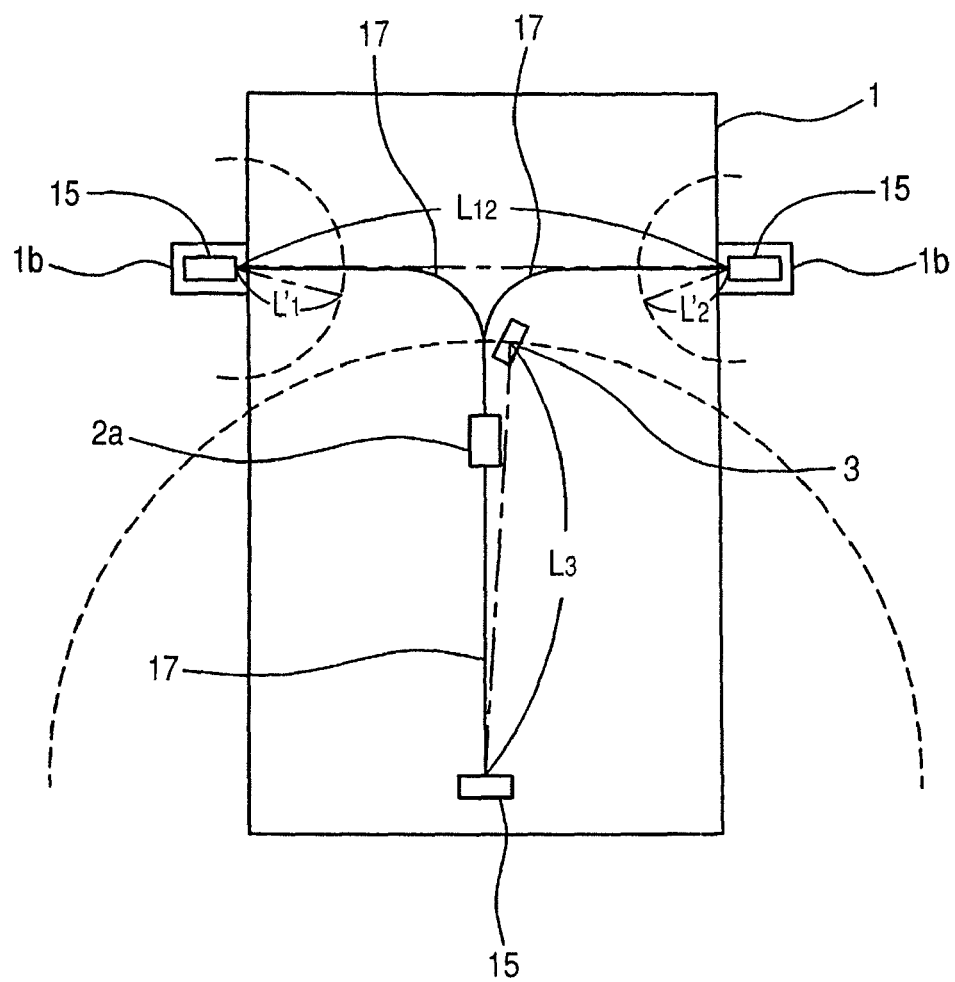
FIG. 7 is a schematic top view of a vehicle when a portable device is in the vicinity of a signal line, showing the relationship of distance between respective transmission antennas.

FIG. 7 is a schematic top view of the vehicle 1 when the portable device 3 is in the vicinity of the signal line 17, showing the relationship of distance between the respective transmission antennas 15. In the drawing, the portable device 3 is located in the vicinity of the signal line 17 connecting the circuit unit 2a and the transmission antennas 15 installed at the left and right door mirrors 1b. Assume that the portable device 3 is located sufficiently remote from the signal line 17 connecting the circuit unit 2a and the transmission antenna 15 installed at the rear portion.

In this case, from the intensity data detected by the portable device 3, although the distance $L_3$ between the portable device 3 and the transmission antenna 15 at the rear portion can be properly calculated, the distance between the portable device 3 and the transmission antennas 15 installed at the left door mirror 1b cannot be properly calculated. This is because the detected intensity data has added thereto the intensity of the electromagnetic waves leaking from the signal line 17; therefore the calculated distance $L_1'$ is smaller than the actual distance $L_1$. Similarly, the calculated distance $L_2'$ between the portable device 3 and the transmission antenna 15 installed at the right door mirror 1b is smaller than the actual distance $L_2$.

In this way, when the calculated distance is smaller than the actual distance, as shown in FIG. 7, the three spheres of a radius $L_1'$, $L_2'$, and $L_3$, which is a distance of the portable device 3, centered at the respective transmission antennas 15 do not intersect each other. Therefore, it is practically impossible to determine the position of the portable device 3. However, such a case where the distance of the portable device 3 is calculated as being smaller than the actual distance by the influence of the signal line 17 occurs only inside the vehicle where the signal line 17 is wired. Therefore, in such a case, the vehicle-side control unit 12 determines that the portable device 3 is located inside the vehicle.

The specific determination is made based on a predetermined threshold value. The threshold value is set equal to or smaller than a half of the distance $L_{12}$ between the transmission antennas 15 installed at the left and right door mirrors 1b. For example, the threshold value is set to about 80 cm when $L_{12}$ is 2 m. Then, it is determined whether an added value $L_1+L_2$ of the distances $L_1$ and $L_2$ calculated based on the intensity data detected by the portable device 3 is equal to or smaller than the threshold value. If the added value is smaller than the threshold value, the portable device 3 is determined as being located inside the vehicle. If the added value $L_1+L_2$ is greater than the threshold value, the position of the portable device 3 is determined based on the intensity data in a manner described above, determining whether it is inside or outside the vehicle. Even in the case where the added value $L_1+L_2$ is greater than the threshold value, there may be a case in which it is practically impossible to precisely determine the position of the portable device 3. However, in such a case, it is possible to determine whether the portable device is inside or outside the vehicle by determining whether the relationship between the three distances calculated from the intensity data satisfies a predetermined relation.

The vehicle-side control unit 12 performs different controls depending on whether the portable device 3 is inside or outside the vehicle (S13). When the portable device 3 is not determined as being located outside the vehicle; that is, when the portable device 3 is determined as being located inside the vehicle, the flow ends here.

When a user presses the request switch 16 to unlock the door, the portable device 3 is supposed to be located outside the vehicle. Therefore, if a user unlocks the door when the portable device 3 is located inside the vehicle along with the user, a person without the portable device 3 can unlock the door by pressing the request switch 16. To prevent such circumstances, the door is not unlocked when the portable device 3 is inside the vehicle. On the other hand, if the portable device 3 is determined as being located outside the vehicle, an unlock command signal is output to an unlock equipment of the door to unlock the door (S14).

Hereinabove, the operation of pressing the request switch 16 to unlock the door has been illustrated and described. However, regarding an operation of locking the door, similar operations may be performed such that the position of the portable device 3 is determined and controls corresponding to the results of the position determination are performed. In addition, without being limited to the locking and unlocking of the door, regarding an operation of starting an engine or the like depending on the position of the portable device 3, similar operations may be performed such that the position of the portable device 3 is determined and controls corresponding to the results of the position determination are performed.

In this way, during determination on whether the portable device 3 is inside or outside the vehicle, when the added value of the distances calculated based on two of the plural intensity data detected by the portable device 3 is equal to or smaller than the predetermined threshold value, it is determined that the portable device 3 is located in the vicinity of the signal line 17 wired within the vehicle and is thus inside the vehicle. For this reason, even when by the leaking electromagnetic waves from the signal line 17, the distances calculated from the plural intensity data do not match, it is possible to determine the position of the portable device 3 in a secure manner. In addition, since the threshold value for use in the determination is set smaller than a half of the distance between the transmission antennas 15, when the portable device is located within the range where there is an influence of the leaking electromagnetic waves from the signal line 17, it is possible to determined that the portable device is located inside the vehicle.

Hereinabove, the present disclosure has been illustrated and described with reference to the embodiment but can be made to the details of the above-described embodiments without departing from the underlying principles of the disclosure. For instance, in the embodiment described above, three transmission antennas 15 were provided to the outer body of the vehicle 1. However, the plural transmission antennas 15 may be provided inside the vehicle. In the embodiment described above, as an example of the case where it is difficult to determine the position of the portable device 3, a case was described in which the portable device 3 is located in the vicinity of the signal line 17 connecting the vehicle-side control unit 12 and the transmission antennas 15 installed at the left and right door mirrors 1b. However, the same statement can be applied to the case where the portable device 3 is in the vicinity of other signal lines 17. That is, the portable device 3 may be determined as being located inside the vehicle when an added value of two distances calculated from two transmission antennas 15 including the transmission antenna 15 connected to the signal line 17 from which the portable device 3 has detected the leaking electromagnetic waves is equal to or smaller than a predetermined threshold value. In this case, the predetermined threshold value needs to be set at least smaller than the distance between the transmission antennas 15. Therefore, when the distance between the portable device and the transmission antennas calculated based on the intensity data is too small to be regarded as a practical one, it is determined that it results from the influence of the electromagnetic waves leaking from the signal line. For this reason, the determination is made only in such a range where there is an influence of the leaking electromagnetic waves. In this embodiment, the predetermined threshold value is set equal to or smaller than a half of the distance considering measurement precision or the like. For this reason, the determination is made only in such a range where there is an influence of the leaking electromagnetic waves from the signal line even when measurement errors are taken into consideration. If a proper value is determinable through experiments, the threshold value may be set smaller the distance between the transmission antennas 15 or may be set greater than a half of the distance.

In the embodiment described above, the determination of the position of the portable device 3 was performed by the vehicle-side control unit 12. However, the determination of the position may be performed by the portable device-side control unit 22 having detected the signal intensity and the results of the determination may be transmitted to the vehicle-side device 2. Moreover, the calculation of distance in the embodiment described above does not need to calculate the actual distance. Instead, since the intensity data themselves correspond to the distance, the calculation of distance includes comparing the intensity data with each other.

The terms and descriptions used herein are set forth by way of illustration only and are not meant as limitations. Those skilled in the art will recognize that many variations can be made to the details of the above-described embodiments without departing from the underlying principles of the disclosure. The scope of the disclosure should therefore be determined only by the following claims (and their equivalents) in which all terms are to be understood in their broadest reasonable sense unless otherwise indicated.

What is claimed is:
1. A keyless entry system, comprising:
a vehicle-side device, comprising:
a vehicle-side transmission unit, which is installed in a vehicle and connected to plural transmission antennas, that transmits a request signal via signal lines, and
a vehicle-side reception unit that receives an answer signal; and
a portable device, comprising:
a portable device-side reception unit that receives the request signal, and a portable device-side transmission unit that transmits the answer signal, wherein the vehicle-side device includes a vehicle-side control unit that performs a predetermined control when the answer signal from the portable device is authenticated, wherein the portable device includes a portable device-side control unit that detects the intensity of the signals transmitted from the plural transmission antennas, wherein one of the vehicle-side control unit or the portable device-side control unit calculates distances between the portable device and the respective transmission antennas based on data of the intensity of the signals transmitted from the plural transmission antennas detected by the portable device-side control unit and when an added value of the distances calculated based on two of the intensity data is smaller than a predetermined threshold value, determines that the portable device is located inside the vehicle, wherein the predetermined threshold value is set smaller than the distance between two transmission antennas corresponding to the two intensity data.

2. The keyless entry system according to claim 1, wherein the predetermined threshold value is set equal to or smaller than a half of the distance between the two transmission antennas corresponding to the two intensity data.

* * * * *